Dec. 22, 1970    W. J. MESINGER ET AL    3,549,441
METHOD OF PRODUCING A HOLLOW ARTICLE HAVING
A DECORATIVE APPEARANCE
Filed Dec. 27, 1966

INVENTORS
William J. Mesinger
Robert H. Mesinger
BY *William F. Mesinger.*
ATTORNEY

United States Patent Office 3,549,441
Patented Dec. 22, 1970

3,549,441
METHOD OF PRODUCING A HOLLOW ARTICLE HAVING A DECORATIVE APPEARANCE
William J. Mesinger, R.R. 1, Castle Hill Road, Newtown, Conn. 06470, and Robert H. Mesinger, Lake Crest Drive, Aunt Hack Ridge, Danbury, Conn. 06810
Filed Dec. 27, 1966, Ser. No. 604,861
Int. Cl. B29c 5/04; B32b 5/18
U.S. Cl. 156—79     9 Claims

ABSTRACT OF THE DISCLOSURE

A process for producing a flexible plastic hollow article having a decorative appearance such as a cycle cover which comprises multiplane rotationally heat treating, in a hollow mold, plastic material and a minor proportion of decorative solid particles.

---

This invention relates to a method of forming a flexible hollow article such as a cycle saddle cover. More particularly the invention relates to a method for rotation molding a seamless unitary hollow article from a fusible plastic material which provides for the economical production of a great variety of decorative effects.

Decorative effects with plastic sheet material have been effected by incorporating various colored particles in a heat cureable plastic or plastisol when it is formed and calendared into sheets; but only the particles at the surface are seen to contribute to the appearance. A laminated sheet wherein a clear outer plastic layer is laminated to a decorative design which in turn is laminated to an opaque back up sheet provides an enhanced appearance because the decorative material is seen more clearly and with the effect of depth.

Attempts to obtain a good decorative appearance on rotation molded hollow plastic articles by incorporating decorative particles in the plastisol mix or plastic mixture used in the molding process were not fully satisfactory because it was found that only the particles near or at the surface showed clearly and the mass of patricles which had to be used for surface appearance masked the rest so the effect was rather dull. The effects on an article molded when incorporating metal flake in the plastisol were disappointing too and the amount of expensive high lustre flake needed increased production costs.

According to the invention it has been found that a greatly enhanced desirable decorative effect can be obtained by incorporating a much smaller amount of decorative particles such as shiny metal flakes in a specially selected and proportioned plastic composition or a plastisol mix formulated to produce a substantially clear or transparent skin when the mix is rotation molded to cure it and so carrying out the process that there is provided an opaque colored layer on the inside surface of the rotation molded article. According to one procedure this inside surface layer is formed by additionally rotation molding an opaque colored (including white or black), fusible plastic or plastisol mix there in. According to another procedure, a pigment containing paint-like mix is sprayed or otherwise coated against the inside surface of the article to form an opaque layer.

It has been further discovered that the process procedures can be modified to produce the desired decorative result of having a brilliant appearance of flecks in depth seen in the outer surface of an article and having also an inner layer which is opaque and which may also contribute to the thickness and strength of the walls.

A plastisol formulation is provided which may be a vinyl base modified with plasticizer and other ingredients to cure substantially transparent and have selected low viscosity and easy gelling properties; incorporating decorative particles such as metal flake, and also according to the inner skin portion desired, a substantial portion of solid particles of a plasticized opaque and pigmented P.V.C. material to make a mix which is kept homogenous until a measured amount is put in a hollow mold. The charged mol is rotationally heat treated for predetermined time and temperature after which the desired article is removed from the mold without need of further internal wall treatment. As a further variation, other basic plastic material may be used instead of the P.V.C. for the solid particles particularly a selected type of polyethylene having melting, specific gravity, flexibility and other properties suited to the other steps of the process.

As a further modification it has been found that the ingredients can be all in the dry powder or solid particle state and the article be produced by a single rotation molding oven treatment of the charged hollow mold. In accordance with time and temperature of the heat treatment, a mix is made up of a dry clear vinyl base powder or particulate material formulation for a clear result and to have good fluidity as it gells and fuses, a relatively minor amount of decorative particles such as metal flake, and a selected amount of dry solid opaque vinyl base powder of preferably larger particle size, the fusion temperatures being chosen so that the clear material fuses first to form the outer layers of the article walls, the opaque material then forming the inner layers.

This dry powder process may also be practiced by using other basic plastics such as incorporating in the vinyl base powder a solid particulate opaque polyethylene having properties selected according to the powder it is mixed with and the steps of the process.

Objects of the invention are to provide improved processes for rotation molding hollow articles which provide a greatly enhanced decorative appearance; which can substantially reduce costs by reducing the amount of expensive decorative particles used and gaining enhanced decorative appearance; which can be practiced so as to reduce the amount of more expensive plastisol while retaining the strength of the article walls and the enhanced decorative effects; by which successive production runs of the article made can be quickly and inexpensively changed as to color combinations, and which makes available a great variety of color combinations and decorative effects; by which an inner surface wall may be provided having not only desired opacity but also a sponge like or plastic foam characteristic.

Further objects of the invention are to provide a process that can be carried out so as to produce in a single heat treatment a hollow article having substantially transparent outer wall layers and substantially opaque inner wall layers and which also can be practiced to provide the above described advantages.

It is also an object of the invention to provide a process for producing a hollow unitary article of tough and flexible plastic which has walls, the outer layers of which are substantially transparent and having distributed and encapsulated therein colorful decorative flecks and particles and the inner layers of which form a background which is substantially opaque and of a desired color.

Other objects and advantages of the invention will be apparent from the following description having reference to the drawing in which.

Figure 1:
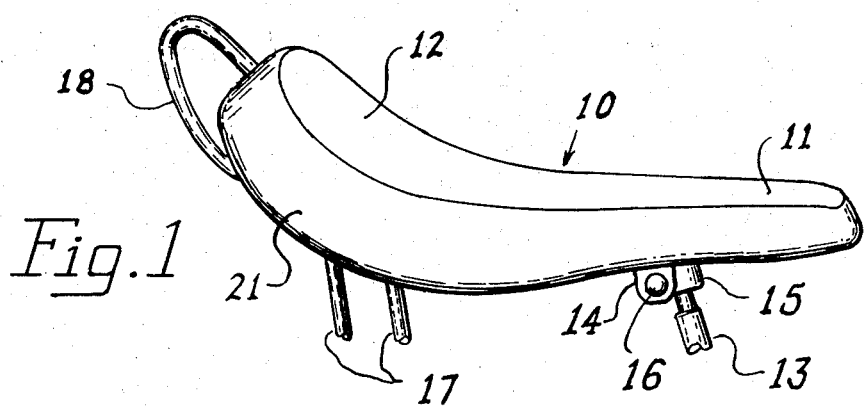
FIG. 1 is a view in perspective of an exemplary article made according to the invention in the form of an elongated cycle saddle cover.

Referring now to the drawings, an example of the article made according to the invention is in the form of an enlongated type of bicycle saddle top cover indicated generally at 10, FIG. 1. This has a transversely narrower forward end 11, a wider rear portion 12 and sides 21 that enclose a padded metal frame base not shown in FIG. 1 but seen in section at 26 in FIG. 2. The metal base 26 is secured on a bicycle (not shown) in customary manner by clamp ears 14 depending from the base to a seat post clamp 15 on the upper end of the customary bicycle seat post 13, the ears and clamp being secured by a bolt 16. The rear portion of the saddle base is mounted on rods 17 which extend downwardly on each side of a bicycle rear wheel to be secured to the cycle frame in known manner. There may also be provided a metal loop 18 attached to the seat base for a convenient hand hold. These metal frame parts are not parts of the present invention.

Figure 2:
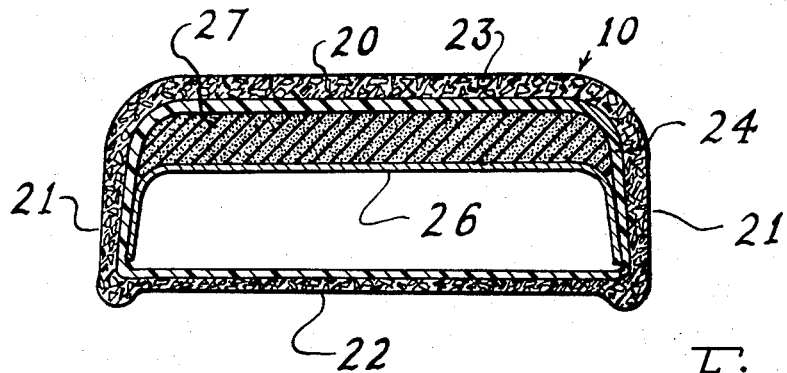
FIG. 2 is a view of a transverse cross section on an enlarged scale of the article of FIG. 1, and with thicknesses exaggerated for clarity.
Figure 3:
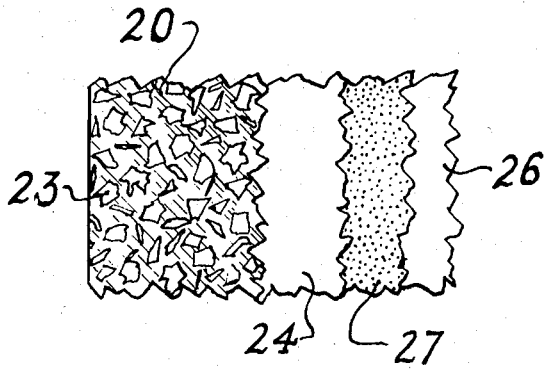
FIG. 3 is a fragmentary plan view of the cover with upper layers partly removed successively.

The views in FIG. 2 and 3 illustrate the more important aspects of the invention in the article, the process being hereinafter more particularly described. Thicknesses have been exaggerated for purposes of clarity in the drawing. The article comprises an outer wall layer 20, the outer surface contour and texture of which is the reverse of the contour and texture of the inside surfaces of a hollow mold in which it was formed. It includes downwardly depending side walls 21 united to a bottom wall 22 which may have suitable openings in the areas of the clamp ears 14 and connections to the bars 17.

The outer wall layer 20, 21 and 22 is formed of a heat cured substantially transparent plastic composition or plastisol containing suspended therein substantially uniformly dispersed solid colored decorative particles 23 which may be of bright colored plastics of various shapes or metallic flakes, silvery or bronze or gold color or preferably a high lustre aluminum flake which can be provided by anodizing and colored to have various high lustre colors as well as silver and gold color. This will be further described hereinafter.

United to the interior surface of the walls 20, 21 and 22 is a layer 24 of flexible opaque material of selected color to provide a colored background against which the decorative particles are caused to show more clearly, the clear outer plastic makes them show at various depths greatly enhancing the sparkle and attractive appearance. As hereinafter described this layer 24 may be deposited in fluid form in a spray and adhered by evaporation of a solvent or it may be formed by casting a heat curable or fusible plastic or vinyl base plastisol in situ. This layer may have any desired color according to the pigment filler employed. This layer may also include a foaming agent such that the layer 24 may become sponge like. FIG. 2 indicates how the cover encloses the base plate 26 and a pad of resilient material such as sponge rubber 27 on the base under the top seating surface wall.

FIG. 3 is a plan view of a rectangular piece of the saddle cut out of and through the upper layers of the saddle with portions removed to expose the under layers. The layers 20 and 24 are outer and inner layer portions of the unitary article according to the invention, and the layers 27 and 26 are the sponge rubber or like cushion and the supporting frame base which are conventional and not parts of the invention.

The layer 20 is in at least its surface parts substantially transparent and the decorative particles 23 distributed and suspended therein are seen quite clearly with high lustre and very attractive appearance. The background layer 24 should be of a material that is flexible and adherant and relatively opaque, preferably quite opaque and of a color selected to accomplish the appearance desired, the color showing through the outer layer between flakes. The amount of decorative particulate material 23 is less than an amount which would mask the background color and thus form its own background which would provide a more dull effect so that the near the surface flecks do not "Stand Out." With a limited amount of decorative particles of about 0.1% to about 7% in the clear layer, the decorative effects are found to be more desirable.

The total thickness of the wall including layers 20 and 24 is equal to that needed for the desired strength and durability. The relative thicknesses are varied from that illustrated; the inner layer 24 thickness can be a very small part of the total or a major part of the total as will be stated hereinafter.

The hollow saddle cover or article is made by rotationally molding it in a heated hollow mold. A measured amount of a suitably formulated plastic base composition mixture having sufficient fluidity that it will distribute against the inside walls of the mold when rotated in all directions, is placed in the mold which is then closed and inserted in an oven on a mechanism that rotates the mold in all directions to evenly distribute the mix on the interior surfaces of the mold. The heating at a selected temperature and for a predetermined time first causes a skin of plastic to build up and cure to form a very durable flexible layer having an exterior contour and surface texture which is the exact reverse of that of the inside of the mold. Such hollow molds may be produced by a process including electro-deposition of metal on a pattern and the mold so produced may be provided with a filler opening which is sealable by a plug or suitable cover.

According to a preferred process for practicing the invention, there is provided a formulated vinyl base plastisol mix, which when fully cured in a mold will form a highly translucent or substantially transparent skin. The formulation should be such as to have adequate fluidity and to hold particles evenly in suspension, also to have a curing time and temperature equal to two cycles in the rotation oven. To this plastisol is added a predetermined small portion of solid colored decorative particles or flecks forming a mix which by agitation is kept uniformly mixed so that the particles are dispersed and kept suspended. The skin made from such mix in one cycle is not fully cured but is quite translucent in spite of the particles, and even though the material surrounding each particle is substantially transparent. After heat treating the mold containing a measured amount of said mix to form an outer surface skin, the mold is cooled, its cover removed, the skin under the cover punctured and a measured amount of a heat curable opaque plastic material or plastisol is placed inside of the first or outer molded skin 20. The amount is adjusted according to the results desired; it can vary from an amount just enough to make an opaque coating to an amount which serves to supplement the thickness of the first or outer skin 20 to make a total thickness desired for the article to have the strength and durability required. In other words the second or inneropaque backing material of a less expensive plastisol or a fusible plastic could be equal to or thicker than the original skin to save a portion of the more expensive transparent plastic. The outer skin 20 thus should be at least thick enough to give the desired depth appearance to the decorative particles in it and to be adequately wear resistant, the second skin 24 being thick enough so that the total thickness is adequate for long lasting durability in use. The mold is heat treated rotationally again for the same time and temperature which completes the cure of the outer skin and the inner layer.

It has been found that for a cycle saddle cover, the total thickness range is preferably about 0.08 inch to 0.16 inch and that the first skin 20 should preferably be a least 0.015 inch thick and preferably between 10% and 75% of the total thickness except where a thinner inner layer is used. The compositions of the first and second skin materials are selected to be compatible with each other and that they will unite or adhere during the second heat treatment. Thereafter the mold is cooled, its cover removed and the unitary composite hollow article while still warm, can be readily pulled out of mold through the opening. After waste material is removed to form openings in the bottom 22, which openings may be formed as described in U.S. Pat. No. 3,008,190 of Robert H. Mesinger, the hollow article if a saddle cover is ready for assembly on an underframe. Saddle covers of highest quality have been made when the ratio of the outer layer material to the inner layer is 60% to 40% total.

Further according to the invention, a first or outer skin 20 is formed in the mold as above described except that the amount of decorative particle containing plastisol mix used is sufficient to provide a wall thickness which is nearly equal to the total wall thickness of the finished hollow article. After the oven processing which should provide a complete cure, and cooling, the mold cover is removed and the article pulled out of the mold. The waste material is removed from the bottom wall 22 to provide the openings therein and prepare for the next operation.

For this, a paint like sprayable composition is provided which will form a tightly adherent flexible completely opaque film layer 24 on the inside of the cured outer skin. Preferably this composition is a type of Vinyl ink including a vinyl base, opaque pigment, and a solvent thinner such as methyl-ethyl Ketone. Other paint-like compositions can be used which will provide an adherent flexible opaque film and are sprayable. Alternatively, immediately after the rotation oven treatment and while the article is in the mold and hot, a paint like fluid or evaporative hardening organosol can be put into the inside of the article, the mold closed, and rotated outside of the oven so that the material is distributed and quickly forms a skin or film on the inside surfaces by accellerated evaporation of solvent and curing action of the residual heat. The organosol can also be spray coated in the article in the mold while it is still warm so that it is not necessary to further rotate the mold.

By a suitable spray nozzle mechanism this paint-like composition is sprayed thru the bottom opening on the interior sufaces of the hollow article until the desired thickness of coating is formed after which the coating is allowed to harden into a flexible and tough inner skin 24 which serves as an opaque color background that makes the particles in the clear outer skin show clearly and with high lustre.

The decorative particles as previously mentioned may be of a material compatable with the materials of the outer layer and of various sizes and shapes. They may be pieces of brightly colored and glossy plastic film or of vapor plated plastic film cut into small geometric shapes. A very attractive article is formed by using metal flakes such as bronzes and the like. A preferable flake is made of an aluminum foil which may be used in a silver grey form or bright silvery anodized form. Anodized aluminum flake having various colored lustrous surfaces and shapes is a preferred material coated with a colored laquer that protects the metal from reactions with the plastic materials. The particles can be all of one size or a mixture of sizes and one or more colors according to the decorative appearance to be produced. Preferred is a flake made from aluminum foil coated with clear and/or colored protective laquers such as epoxies, vinyls, nitrocellulose, and cut into desired sizes and shapes or staple lengths, the laquer to be chosen so that it is not softened or dissolved in the plastisol or plastic mix. The foil thickness may be about 0.0045 inch and the minimum size of the flecks may be about 1/64 inch. It was found that the flake particles that are nearest the surface are coated by a thin clear layer of plastic and are highly visible.

As an example of a hollow article produced according to the invention, an elongated type saddle cover was made by adding 0.1 to 2% by weight high lustre coated aluminum flake having particle width of 1/64 inch to a plastisol of polyvinyl chloride with plasticizer mix formulated to cure into a transparent skin while continuously stirring. A measured amount of this mix sufficient to cast a skin having an average thickness of 0.08 inch was introduced into each of a group of hollow molds which were then closed and the group was rotated about two axes in a heated oven. The group was thus treated for 4 minutes at an oven temperature of 445° F.

The molds were then removed from the oven, water cooled and the lids removed. The skin that formed under the lids was slitted and a measured amount of a white pigmented opaque plastisol was put into each mold the amount being chosen to form an inner skin having 0.04 inch average thickness. The molds were closed and returned to the rotation oven and treated for 4 minutes at an oven temperature of 445° F. after which the molds were cooled, opened and the saddle covers pulled out. These covers were found strong, durable and of exceptionally attractive appearance. The white background made the flakes seem to float in depth in the substantially clear outer layer so that they sparkled.

Another example of a hollow article was produced by adding 1% of green colored bright anodized aluminum flakes to the plastisol formulated to produce a substantially transparent skin, which mix was continously stirred. A measured amount of this mix was put into a mold, the amount being enough to form a skin 0.11 inch thick. The charged and closed mold was treated for 5 minutes in a rotation oven at 450° F. and after cooling it was opened and the resulting form was pulled out and the bottom openings therein were cleared of scrap skin, the hollow article was mounted bottom up and a multihole spray nozzle inserted thru the larger opening. A vinyl ink composition with white pigment and of sprayable consistency was pumped through the nozzle which impinged the composition substantially evenly on the interior surfaces of the article until a desired thickness of coating was formed; about 0.01 inch average. It is preferable that the coating be at least thick enough to provide durability especially under the seating areas of the outer skin or top portions of the saddle.

After the coating dried by evaporation of solvent and became sufficiently hard and tough, the saddle cover was mounted on an underframe having thereon a foam cushion pad.

As hereinabove described, process alternatives that can produce the article in a single rotation oven treatment have advantages of increasing the productive output of an oven apparatus and of using in part a relatively lower cost ingredient. When the single treatment process using a vinyl base transparent material mixed with a minor proportion of flake and with particles of opaque vinyl base materials is used, it is found that the particle size of the latter may be adjusted to slow the fusion as well the selection of the fusing temperature relative to that of the outer skin material. It was found that the clear flake encapsulating skin layer 20 is formed first while the opaque layer 24 forms later and both cure in that relation. It was found that the colors of a solid vinyl type particles will tend to bleed out into the liquid of a plastisol mix if a mix is allowed to stand while constantly stirred for too long a time. No such difficulty is experienced when a batch is held over night, but the holding time should not be longer than about 24 hours.

When instead of the vinyl base opaque particles a polyetheylene base material is used, it is of the low density type and the melting temperature must not be so high that the molds would have to be heated enough to overcure the outer skin 20.

When the ingredients are all in a free flowing powder or particulate form it is found that the particles of vinyl base material for the outer layer 20 and the plastic particles for the inner layer 24 are preferably of rounded shape which contributes to the flowability so that the particles as they flow evenly in contact with the hot mold surface, melt and adhere to build up a solidifying skin from the outside toward the inside, it being found that the decorative particles become evenly distributed and encapsulated in the skin. The inner skin forming particles take longer to heat to their melting temperature and tend to keep flowing over the surface of the first or outer skin that fuses and cures. When the first skin fuses to a cure the inner skin is melted into contact and cures or subsequently cools to form the flexible inner layer 24.

The time and temperature of the mold treatment is adjusted and correlated to the properties of the outer and inner layer material. For the single heating powder material processes it has been found that a heat treament as short as 3 minutes can complete an article when the heat input to the rotating molds is efficient and fast. Due to heat transfer resistances the outer surfaces of a mold reach higher temperatures than the materials in the mold.

In any of the above described alternative processes, except when the inner layer is to be made by spray deposition of a paint, the inner layer 24 can be produced to have a foam-like consistency to a limited degree by incorporation in the material that forms the inner layer a suitable foaming agent of the kind known to plastic composition formulators. Such an inner foam layer provides the desired opacity and may be sufficiently soft and thick that the thickness of the cushioning 27 can be substantially reduced or even eliminated.

It will be understood that modifications and variations may be effected without departing from the spirit and scope of the invention.

What is claimed is:

1. A process for producing a flexible plastic hollow article having a decorative external appearance such as a unitary cycle saddle cover by the multiplane rotational heat treatment in a closed hollow mold of a charge of a curable plastic material in an initial flowing condition until an article wall of desired character and thickness is formed on the inner surfaces of the mold; the steps of charging such mold with a measured amount of a transparent vinyl base resin formulation in a flowing condition which formulation will fuse and cure into a substantially transparent outer layer when a charged mold is multiplane rotated for 4 to 5 minutes while heated to a temperature of 445° to 450° F.; premixing in said transparent formulation between 0.1 and 7% of decorative solid particles to be evenly distributed therein; forming said outer layer by rotational heat treatment whereby said solid particles are evenly distributed and encapsulated in said transparent outer layer; providing through an opening in a wall of said outer layer within the mold a measured amount of an opaque plastic base curable material of selected color; and distributing and curing such opaque material substantially evenly against the inside surface of the outer layer; the amounts of said transparent particle containing formulation and said opaque material being chosen to form an article wall of about 0.08 inch to 0.16 inch total thickness and the thickness of said transparent layer between 10% and 75% of such total thickness whereby in the finished article, the decorative particles show clearly and in depth against the background provided by the inner opaque layer.

2. A process according to claim 1 in which the vinyl resin formulation is a vinyl base plastisol and the proportion of decorative solid particles mixed therewith is between 0.1% and 2% by weight.

3. A process according to claim 1 in which the vinyl resin formulation is provided in a solid free flowing particulate form and the proportion of decorative solid particles mixed therewith is between 0.1% and 7% by weight.

4. A process according to claim 1 in which the opaque plastic base material is a vinyl ink or paint sprayed on the inside surfaces of the outer layer.

5. A process according to claim 1 in which the opaque plastic base material is a heat curable opaque vinyl base plastisol which is introduced and caused to gel and cure by the rotational heat treatment in a layer against the inner wall surface of the outer layer, the amount being correlated to that of the outer layer to form an article wall of desired thickness.

6. A process according to claim 1 in which the opaque plastic base material is a solid opaque pigmented vinyl base plastic material in granular flowable form and measured amount which melts to form the inner layer during the rotational heat treatment.

7. A process according to claim 1 in which the opaque plastic base material is a polyethylene base pigmented solid in granular flowable form which melts to form the inner layer during the rotational heat treatment.

8. A process according to claim 1 in which the opaque plastic base material is a pigmented organisol a measured amount of which is distributed on the inner surfaces of the hollow article while it is warm in the mold.

9. A process according to claim 1 in which the opaque plastic base material is a plasticized opaque vinyl base plastic material in flowable form and containing a foaming agent which during rotational heat treatment forms the inner layer to provide the background and also a cushion layer of limited thickness.

References Cited
UNITED STATES PATENTS

| | | | |
|---|---|---|---|
| 3,257,252 | 6/1966 | Keel | 156—79 |
| 3,423,273 | 1/1969 | Mazur | 156—79X |
| 3,008,190 | 11/1961 | Mesinger | 264—310X |
| 3,231,645 | 1/1966 | Balomey | 264—310X |
| 3,246,069 | 4/1966 | Maynord | 264—310X |

CARL D. QUARFORTH, Primary Examiner

S. HELLMAN, Assistant Examiner

U.S. Cl. X.R.

156—245; 264—310, 312